US012383465B2

(12) United States Patent
Smith et al.

(10) Patent No.: US 12,383,465 B2
(45) Date of Patent: Aug. 12, 2025

(54) CASSETTE BAGS FOR TRANSPORTING BIOMATERIALS

(71) Applicant: Cryoport, Inc., Brentwood, TN (US)

(72) Inventors: Steffen Smith, View Park, CA (US); Mike Dybicz, Nashville, TN (US); Brittany Roberts, Brentwood, TN (US); Bobby Onel, Laguna Beach, CA (US)

(73) Assignee: Cryoport, Inc., Brentwood, TN (US)

( * ) Notice: Subject to any disclaimer, the term of this patent is extended or adjusted under 35 U.S.C. 154(b) by 568 days.

(21) Appl. No.: 17/853,715

(22) Filed: Jun. 29, 2022

(65) Prior Publication Data

US 2024/0000662 A1 Jan. 4, 2024

(51) Int. Cl.
*A61J 1/16* (2023.01)
*A61J 1/14* (2023.01)

(52) U.S. Cl.
CPC ............... *A61J 1/16* (2013.01); *A61J 1/1412* (2013.01); *A61J 1/1468* (2015.05)

(58) Field of Classification Search
CPC ........... A61J 1/16; A61J 1/1468; A61J 1/1412
USPC .......................................................... 206/438
See application file for complete search history.

(56) References Cited

U.S. PATENT DOCUMENTS 1,719,347 A 7/1929 Weinstein
3,717,005 A 2/1973 McGrew et al.
3,948,409 A 4/1976 Ovchinnikov et al.
3,955,749 A 5/1976 Turkenkopf
4,306,425 A 12/1981 Sitte et al.
4,313,558 A 2/1982 Benham
4,411,138 A 10/1983 Leithauser et al.
4,455,842 A 6/1984 Granlund
4,542,826 A 9/1985 Adams
4,572,363 A 2/1986 Alpern
4,694,655 A 9/1987 Seidel et al.
4,729,494 A 3/1988 Peillon et al.
4,790,141 A 12/1988 Glascock
5,566,821 A 10/1996 Brown
5,954,202 A 9/1999 Mellon
6,206,194 B1 3/2001 Beneroff et al.
6,419,088 B1 * 7/2002 Barrois ................ B65D 25/107
206/570
6,467,642 B2 10/2002 Mullens et al.
(Continued)

FOREIGN PATENT DOCUMENTS

CN 2412849 Y 1/2001
CN 200794335 U 10/2018
(Continued)

OTHER PUBLICATIONS

USPTO; Non-Final Office Action dated Dec. 2, 2011 in U.S. Appl. No. 12/658,641.
(Continued)

*Primary Examiner* — Jacob K Ackun
(74) *Attorney, Agent, or Firm* — Snell & Wilmer L.L.P.

(57) ABSTRACT

An envelope is configured to hold, support, and protect an article such as a blood bag during transportation under fic temperatures. The envelope includes a single piece component (e.g., a monolithic component), including multiple panels that are configured to fold to form an enclosure that surrounds the article such as the blood bag for support and protection of the article such as the blood bag.

26 Claims, 6 Drawing Sheets

(56) References Cited

U.S. PATENT DOCUMENTS

| | | | |
|---|---|---|---|
| 6,539,360 | B1 | 3/2003 | Kadaba |
| 6,913,389 | B2 | 7/2005 | Kannankeril |
| 7,627,926 | B2 | 12/2009 | Williams |
| 7,881,987 | B1 | 2/2011 | Hart |
| 8,220,107 | B2 | 7/2012 | Williams |
| 8,371,449 | B2 | 2/2013 | Simon et al. |
| 8,397,343 | B2 | 3/2013 | Williams |
| 8,904,810 | B2 | 12/2014 | Schabron et al. |
| 9,292,824 | B1 | 3/2016 | Freeman |
| 9,378,442 | B2 | 6/2016 | Barnings |
| 10,987,276 | B2 | 4/2021 | Mongrenier |
| 11,124,354 | B2 | 9/2021 | Waltermire |
| 11,691,788 | B1 | 7/2023 | Smith |
| 2001/0039807 | A1 | 11/2001 | Mogil |
| 2002/0099567 | A1 | 7/2002 | Joao |
| 2002/0102992 | A1 | 8/2002 | Koorapaty |
| 2002/0119880 | A1 | 8/2002 | Hogberg |
| 2002/0144926 | A1 | 10/2002 | Rutledge |
| 2002/0167500 | A1 | 11/2002 | Gelbman |
| 2003/0137968 | A1 | 7/2003 | Lareau et al. |
| 2004/0215532 | A1 | 10/2004 | Boman |
| 2004/0236635 | A1 | 11/2004 | Publicover |
| 2005/0046584 | A1 | 3/2005 | Breed |
| 2005/0171738 | A1 | 8/2005 | Kadaba |
| 2005/0234785 | A1 | 10/2005 | Burman |
| 2005/0246192 | A1 | 11/2005 | Jauffred et al. |
| 2006/0080819 | A1 | 4/2006 | McAllister |
| 2006/0168644 | A1 | 7/2006 | Richter et al. |
| 2007/0009119 | A1 | 1/2007 | Pohle et al. |
| 2007/0028642 | A1 | 2/2007 | Glade et al. |
| 2007/0095722 | A1 | 5/2007 | Messinger |
| 2007/0268138 | A1 | 11/2007 | Chung et al. |
| 2008/0094209 | A1 | 4/2008 | Braun |
| 2008/0162304 | A1 | 7/2008 | Ourega |
| 2008/0208158 | A1 | 8/2008 | Goodman |
| 2008/0291033 | A1 | 11/2008 | Aghassipour |
| 2009/0014537 | A1 | 1/2009 | Gelbman |
| 2009/0293524 | A1 | 12/2009 | Vezina et al. |
| 2009/0314835 | A1 | 12/2009 | Jackson |
| 2010/0025274 | A1 | 2/2010 | Stopek |
| 2010/0080168 | A1 | 4/2010 | Fukuyama |
| 2010/0204558 | A1 | 8/2010 | Zocchi |
| 2010/0299278 | A1 | 11/2010 | Kriss et al. |
| 2011/0031304 | A1 | 2/2011 | Phillips |
| 2011/0176749 | A1 | 7/2011 | Race |
| 2011/0216178 | A1 | 9/2011 | Carpenter |
| 2014/0144800 | A1 | 5/2014 | Delorme et al. |
| 2014/0319022 | A1 | 10/2014 | Chu |
| 2015/0069072 | A1 | 3/2015 | Kelley |
| 2015/0284145 | A1 | 10/2015 | Arimoto et al. |
| 2016/0046410 | A1 | 2/2016 | Nakamura |
| 2016/0229622 | A1 | 8/2016 | Booska |
| 2017/0073146 | A1 | 3/2017 | Kuhn |
| 2017/0255856 | A1* | 9/2017 | Murdoch ......... G06K 19/07773 |
| 2019/0119027 | A1 | 4/2019 | Itou et al. |
| 2019/0175448 | A1* | 6/2019 | Obrad .................... B65D 81/03 |
| 2020/0369435 | A1 | 11/2020 | Greenwood et al. |
| 2021/0315201 | A1 | 10/2021 | McCormick |
| 2023/0225942 | A1 | 7/2023 | Smith |
| 2023/0227209 | A1 | 7/2023 | Smith |
| 2023/0320933 | A1 | 10/2023 | Smith |
| 2023/0339653 | A1 | 10/2023 | Smith |

FOREIGN PATENT DOCUMENTS

| | | | |
|---|---|---|---|
| CN | 210259426 | U | 4/2020 |
| EP | 1642749 | A1 | 4/2006 |
| EP | 3409260 | A1 | 12/2018 |
| JP | 2006-051968 | A | 2/2005 |
| JP | 2007-275568 | A | 10/2007 |
| JP | 3958213 | | 5/2018 |
| WO | 1999-058425 | A1 | 11/1999 |
| WO | 2002053967 | | 11/2002 |
| WO | 2007-028647 | A1 | 3/2007 |
| WO | 2008041663 | A1 | 4/2008 |
| WO | 2021-248238 | A1 | 12/2021 |

OTHER PUBLICATIONS

USPTO; Final Office Action dated Aug. 14, 2012 in U.S. Appl. No. 12/658,641.

USPTO; Non-Final Office Action dated Sep. 11, 2015 in U.S. Appl. No. 12/658,641.

USPTO; Non-Final Office Action dated Dec. 11, 2012 in U.S. Appl. No. 12/852,413.

USPTO; Final Office Action dated May 10, 2012 in U.S. Appl. No. 12/852,413.

USPTO; Advisory Action dated Jul. 31, 2012 in U.S. Appl. No. 12/852,413.

USPTO; Non-Final Office Action dated Jun. 18, 2014 in U.S. Appl. No. 12/852,413.

USPTO; Non-Final Office Action dated Jun. 17, 2016 in U.S. Appl. No. 12/852,413.

USPTO; Final Office Action dated Nov. 29, 2016 in U.S. Appl. No. 12/852,413.

USPTO; Non-Final Office Action dated Jul. 25, 2017 in U.S. Appl. No. 14/589,768.

USPTO; Final Office Action dated Feb. 7, 2018 in U.S. Appl. No. 14/589,768.

USPTO; Non-Final Office Action dated Jun. 19, 2018 in U.S. Appl. No. 14/589,768.

USPTO; Final Office Action dated Dec. 27, 2018 in U.S. Appl. No. 14/589,768.

USPTO, Non Final Office Action dated Jul. 10, 2020 in U.S. Appl. No. 15/841,170.

USPTO, Notice of Allowance dated Oct. 30, 2020, in U.S. Appl. No. 15/841,170.

PCT; International Search Report dated May 31, 2002 in International Application No. PCT/US2001/049684.

PCT; International Search Report dated Jun. 28, 2010 in International Application No. PCT/US2010/023252.

PCT; Written Opinion of International Search Authority dated Jun. 28, 2010 in International Application No. PCT/US2010/023252.

PCT; International Preliminary Report on Patentability dated Mar. 22, 2013 in International Application No. PCT/US2010/023252.

PCT; International Search Report & Written Opinion dated Apr. 24, 2019 in PCT Application No. US2018/065509.

PCT; International Preliminary Report on Patentability dated Jun. 16, 2020 in PCT Application No. US2018/065509.

Electronic Reusable Paper, http://www2.parc.com /hsl/projects/gyricon/, (Oct. 2005).

PCT; International Search Report and Written Opinion of the International Searching Authority dated Oct. 5, 2023 for Application No. PCT/US2023/025748.

PCT; International Search Report and Written Opinion of the International Searching Authority dated Jun. 29, 2023 for Application No. PCT/US2023/015267.

USPTO; Non-Final Office Action dated Jan. 25, 2024 in U.S. Appl. No. 17/580,094.

USPTO; Notice of Allowance dated Feb. 17, 2023 in U.S. Appl. No. 17/580,044.

USPTO; Restriction Requirment dated Mar. 5, 2024 in U.S. Appl. No. 17/889,275.

KIPO; International Search Report and Written Opinion dated May 2, 2023 in PCT application No. PCT/US2023/010113.

KIPO; International Search Report and Written Opinion dated Apr. 24, 2023 in PCT application No. PCT/US2022/053024.

USPTO; Non-Final Office Action dated Jun. 21, 2024 in U.S. Appl. No. 17/889,275.

USPTO; Notice of Allowance dated Jun. 13, 2024 in U.S. Appl. No. 17/580,094.

PCT; International Preliminary Report on Patentability (IPRP) dated Aug. 2, 2024 in Application Serial No. PCT/US2023/010113.

PCT; International Preliminary Report on Patentability (IPRP) dated Aug. 2, 2024 in Application Serial No. PCT/US2022/053024.

(56) References Cited

OTHER PUBLICATIONS

USPTO; Notice of Allowance dated Jun. 12, 2024 in U.S. Appl. No. 18/217,289.
PCT; International Preliminary Report on Patentability (IPRP) dated Oct. 17, 2024 in Application Serial No. PCT/PCT/US2023/015267.
USPTO; Notice of Allowance dated Sep. 3, 2024 in U.S. Appl. No. 17/580,094.

* cited by examiner

SECT. A-A

CASSETTE BAGS FOR TRANSPORTING BIOMATERIALS

FIELD

This specification relates to a system, device or apparatus for cryogenically storing, transporting and/or shipping a liquid, such as blood, under cryogenic temperatures.

DESCRIPTION OF THE RELATED ART

Medical practitioners or professions may refrigerate or freeze blood for storage and/or transportation to a medical facility. When transporting blood, the blood may be refrigerated and stored in a blood bag. Less-dense blood plasma is often frozen at cryogenic temperatures. At cryogenic temperatures, the blood bags may shatter during transport because the storage devices that store the blood bags are brittle at cryogenic temperatures. Blood bag manufacturers may provide an overwrap bag that is made of material that is more cryogenically friendly, i.e., less brittle, and does not shatter at cryogenic temperatures. The overwrap bag is placed over the blood bag and contains the blood within the blood bag if the blood bag shatters. The overwrap bag, however, does not prevent the blood bag from shattering and does not maintain the integrity and usability of the blood that has been released.

Often, the blood bag is placed into a metallic case for transport. The metallic case holds the blood bag while in storage and during transportation. The metallic case holds the shape of the blood bag and protects the blood bag from external damage, such as cuts and punctures. The metal case, however, does not protect the blood bag from shocks and vibrations. Any impact to the metallic case also causes the blood bag to slide and impact the inner surfaces of the case which may cause the blood bag to become damaged.

Accordingly, there is a need for a system, device or apparatus to protect an article such as a blood bag from shock and vibration during storage and transfer.

SUMMARY

In general, one aspect of the subject matter described in this specification is embodied in an envelope to contain an article, for instance, a blood bag envelope. The blood bag envelope is configured to hold, support, and protect a blood bag. The envelope includes a plurality of layers between an internal cavity and an external environment. Each layer in the plurality of layers is configured to protect, hold, and/or support the blood bag disposed within the cavity, in accordance with various embodiments.

An envelope for transporting an object is disclosed herein. In various embodiments, the envelope comprises: a front panel comprising a first plurality of layers; a back panel comprising a second plurality of layers, the back panel coupled to the front panel via a first seal; a sealing apparatus disposed between the front panel and the back panel, the sealing apparatus configured to transition from an open state to a closed state, the sealing apparatus and the first seal defining a cavity of the envelope in response to being in the closed state; a first sealing mechanism disposed between the front panel and the back panel, the first sealing mechanism disposed outside of the cavity; and a second sealing mechanism coupled to an internal surface of the front panel.

In various embodiments, the first sealing mechanism and the second sealing mechanism comprise a double sided tape. The first sealing mechanism and the second sealing mechanism can each comprise a protective layer coupled to one side of the double sided tape.

In various embodiments, the first sealing mechanism is configured to couple the front panel to the back panel after the sealing apparatus is closed. The second sealing mechanism can be configured to couple to an external surface of the back panel. A portion of the front panel can form a crease along a top edge of the envelope in response to coupling the second sealing mechanism to the back panel.

In various embodiments, the first plurality of layers and the second plurality of layers each comprise: an exterior layer comprising a polymeric material; an interior layer comprising an absorbent material; and a barrier layer disposed between the exterior layer and the interior layer.

In various embodiments, the first plurality of layers and the second plurality of layers each comprise a first tie layer disposed between the exterior layer and the barrier layer. The first plurality of layers and the second plurality of layers can each comprise sealant layer, the sealant layer at least partially defining the first seal.

An envelope for transporting an object is disclosed herein. In various embodiments, the envelope comprises: a front panel and a back panel each comprising: an interior layer defining an internal surface, the internal surface at least partially defining a cavity of the envelope; an exterior layer disposed outward from the interior layer; a barrier layer disposed between the interior layer and the exterior layer; a sealant layer disposed between the barrier layer and the interior layer; a first tie layer disposed between the exterior layer and the barrier layer; and a second tie layer disposed between the sealant layer.

In various embodiments, a first portion of the sealant layer of the front panel is bonded to a second portion of the sealant layer of the back panel to form a first seal. The envelope can further comprise a sealing apparatus disposed between the front panel and the back panel, the sealing apparatus configured to transition from an open state to a closed state, the sealing apparatus and the first seal defining a cavity of the envelope in response to being in the closed state.

In various embodiments, the first tie layer couples the exterior layer to the barrier layer. The second tie layer can couple the sealant layer to the barrier layer. The sealant layer can be configured to protect the barrier layer.

A method of shipping a biomaterial article is disclosed herein. In various embodiments, the method comprises: disposing the biomaterial article in an envelope, the envelope comprising an interior layer, an exterior layer, a barrier layer disposed between the interior layer and the exterior layer, and a sealant layer disposed between the interior layer and the barrier layer; transitioning a sealing apparatus from an open state to a closed state to create a first seal of a cavity defined by the sealing apparatus and a manufacturing seal; coupling a first internal surface of a front panel of the envelope to a first internal surface of a back panel of the envelope via a first sealing mechanism to create a second seal; and coupling the first internal surface of the front panel of the envelope to an external surface of the back panel of the envelope to create a third seal.

In various embodiments, a crease is formed at a top edge of the envelope in response to coupling the first internal surface to the external surface.

In various embodiments, the method further comprises placing the envelope in a carrying bag. The method can further comprise placing a plurality of the envelope in the carrying bag, each envelope in the plurality of the envelope having a respective biomaterial article disposed therein. The method can further comprise transporting the carrying bag.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses and devices for transporting and storing an article such as a blood bag. The system, apparatus or device may include a plurality of envelopes ("envelopes") disposed in a sealed bag ("bag") that stores and transports a plurality of articles (such as blood bags) (i.e., each envelope in the plurality of envelopes includes a blood bag in the plurality of bags). Particular embodiments of the subject matter described in this specification may be implemented to realize one or more of the following advantages.

The envelopes disclosed herein are made from a plurality of layers. Each layer in the plurality of layers can, alone and/or in combination, withstand cryogenic temperatures. That is, the envelopes are resistant to brittleness and are not as susceptible to shattering at cryogenic temperatures. The envelopes disclosed herein are configured to absorb any shocks to the envelope, and thus, protects the article from vibrations, drops, impacts, or other shocks. The envelopes disclosed herein can be produced cheaper than typical blood bag transport envelopes, in accordance with various embodiments. The envelopes disclosed herein can be produced with fewer components relative to typical blood bag transport envelopes, in accordance with various embodiments. As disclosed herein, "cryogenic temperatures" refers to temperatures below −180° C. (93K or −292° F.).

Other benefits and advantages include an ease of manufacture and an ease of assembly prior to shipping a blood bag, in accordance with various embodiments. In this regard, the envelopes disclosed herein can be coupled together in a relatively easy manner via a "manufacturing seal" as described further herein. In this regard, two flat sheets can be joined together to form a manufactured state of the envelopes disclosed herein. After being loaded with an cryogenic article (e.g., a blood bag), a first seal can seal the article from an external environment (e.g., a slider zipper or a press to close zipper), and a second seal can provide redundant sealing (e.g., an adhesive, a double-sided tape, or the like). In this regard, prior to shipment of the cryogenic article, the article can easily be loaded and sealed within the envelope, in accordance with various embodiments.

Figure 1:
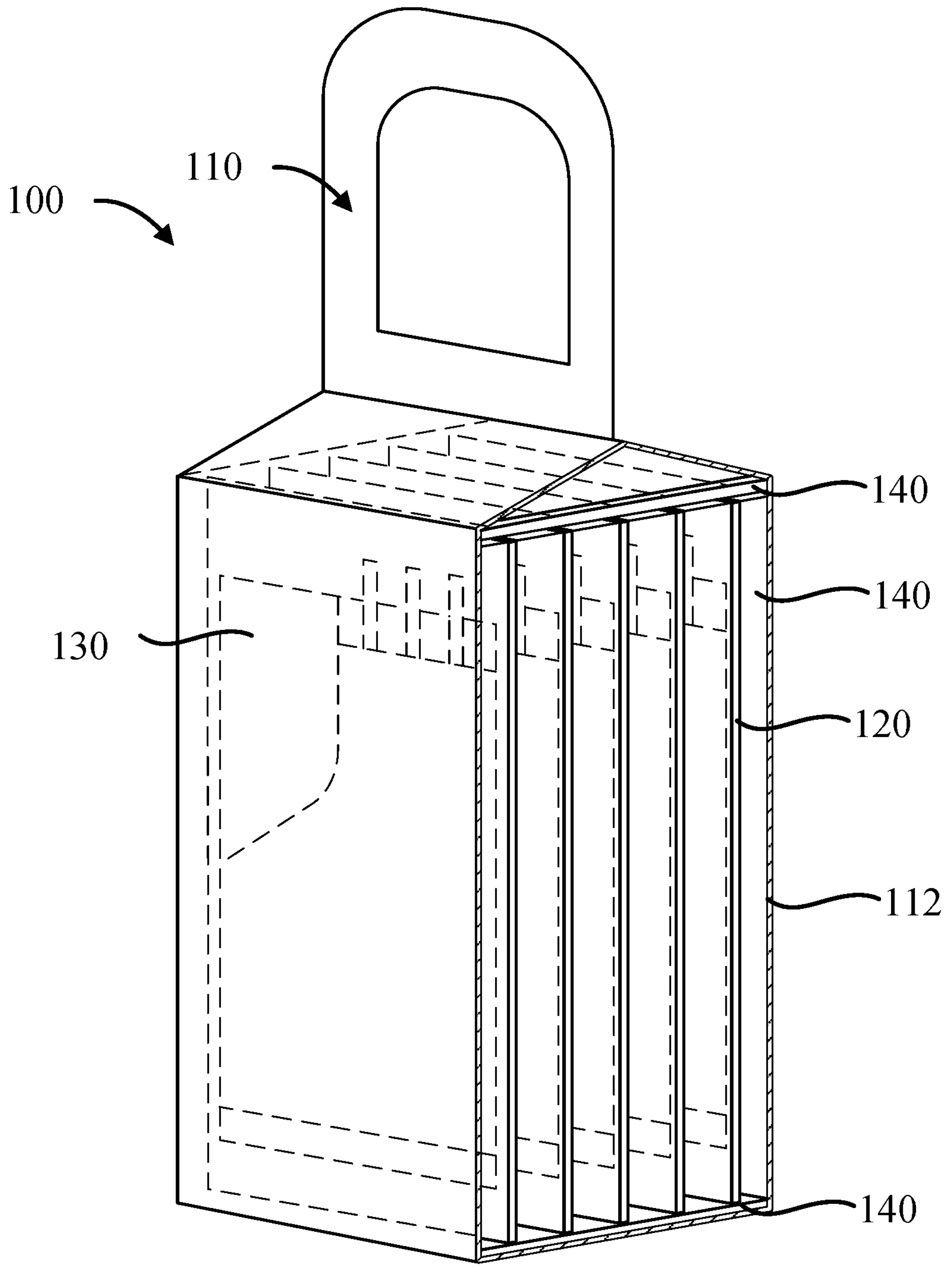
FIG. 1 illustrates a perspective cross-sectional view of a blood bag transport assembly, in accordance with various embodiments.

Referring now to FIG. 1, a perspective cross-sectional view of a blood bag transport assembly 100 is illustrated, in accordance with various embodiments. The blood bag transport assembly 100 comprises a carrying bag 110, a plurality of envelopes 120, a plurality of blood bags 130, and absorbent material layers 140. Each envelope in the plurality of envelopes 120 is configured to house a blood bag in the plurality of blood bags 130. In this regard, each envelope in the plurality of envelopes 120 is configured to protect and/or support a respective blood bag in the plurality of blood bags 130 during transportation of the blood bag transport assembly 100.

In various embodiments, absorbent material layers 140 may at least partially surround the plurality of envelopes 120. For instance, at least a portion of the absorbent material layers 140 may be arranged abutting an internal perimeter of the carrying bag 110. The plurality of envelopes 120 may be received into an area defined by the internal perimeter of the carrying bag 110. Thus, one or more absorbent material layer 140 may be adjacent both an envelope 120 and a wall of the internal perimeter of the carrying bag 110. More specifically, one or more absorbent material layer 140 may be interstitial between the envelope 120 and the wall of the internal perimeter of the carrying bag 110. In various embodiments, adjacent envelopes in the plurality of envelopes 120 may be separated by absorbent material layers 140 disposed between the adjacent envelopes. In this regard, the plurality of envelopes 120 may be dampened in all directions by absorbent material layers 140 during transport of the blood bag transport assembly 100 (i.e., mechanically dampened from shock and vibration of the carrying bag 110 that may occur during transport). Thus, each blood bag in the plurality of blood bags 130 may be dampened by a respective envelope in the plurality of envelopes 120 as described further herein, as well as being dampened by the absorbent material layers 140 disposed within a cavity 112 defined by the carrying bag 110 as described further herein.

Figure 2A:
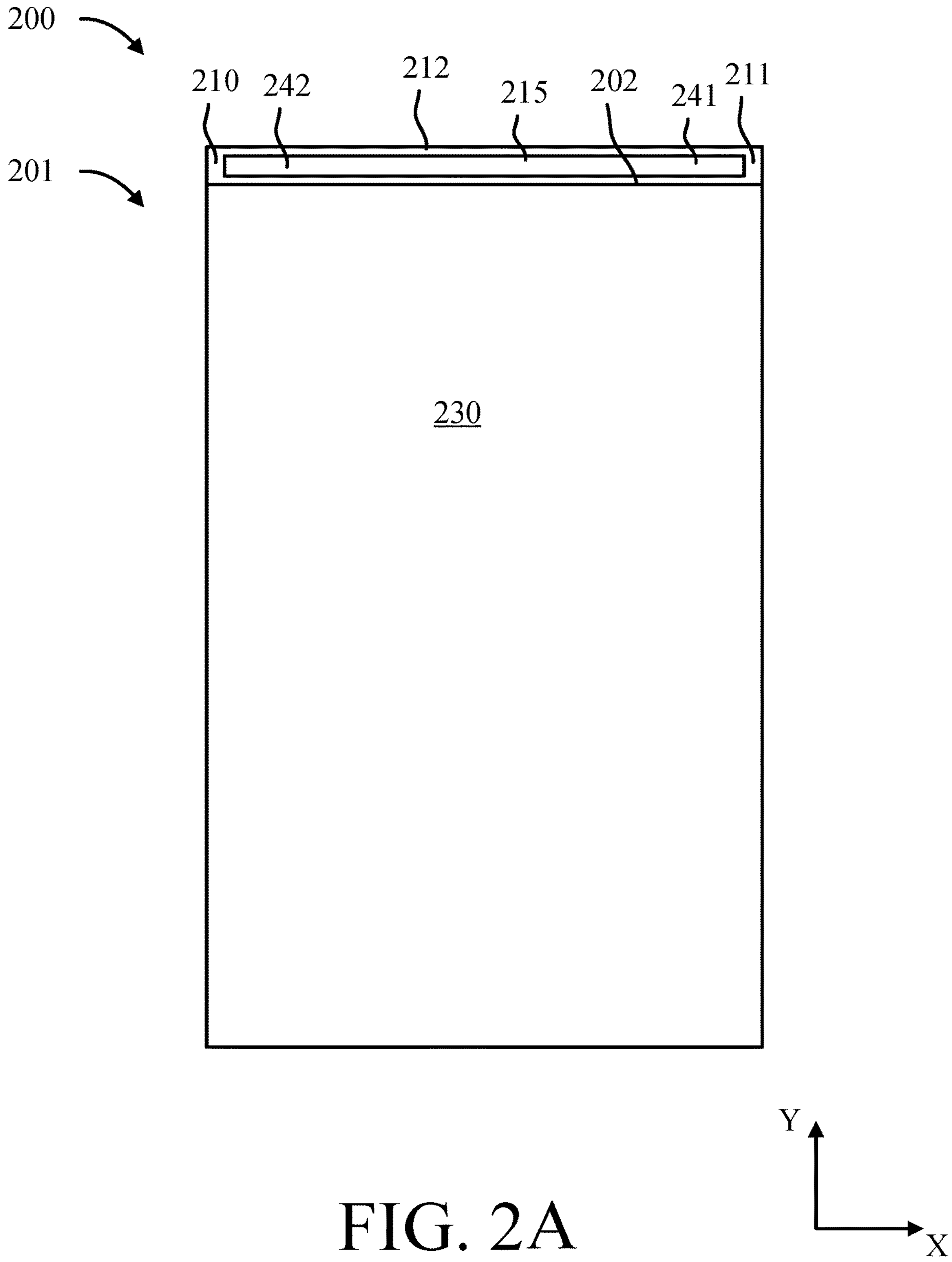
FIG. 2A illustrates a back view of an envelope for use in a transport assembly, in accordance with various embodiments.

Referring now to FIG. 2A, a back planar view of an envelope 200 is illustrated in connection with X-Y-Z axes and in accordance with various embodiments. The envelope 200 may be utilized in a blood bag transport assembly 100 from FIG. 1 (e.g., as one of the plurality of envelopes 120). The envelope 200 may be made of a plurality of layers as described further herein and may be configured to withstand cryogenic temperatures without shattering or breaking. The envelope 200 may hold, enclose and protect different sizes of blood bags, such as a 50-ml blood bag, a 250-ml blood bag, and/or a 500-ml blood bag, or the like.

In various embodiments, the envelope 200 is in a manufactured state 201 prior to transporting an article (e.g., a blood bag or the like). In the manufactured state 201, a front panel 210 is coupled to a back panel 230 by an adhesive (e.g., an epoxy, tape, etc.) as described further herein. A "manufactured state" as described herein, refers to a configuration of the envelope 200 after the envelope 200 is manufactured. For example, the envelope 200 is manufactured to form a manufactured state, then sealed after being loaded with an article (e.g., a blood bag) to form an assembled state. The "assembled state" as described further herein, refers to a configuration of the envelope 200 after the envelope 200 is fully sealed (i.e., after a blood bag, or other cryogenic article, is placed in a cavity of the envelope 200 while the envelope 200 is in the manufactured state 201). In the "assembled state", the envelope 200 can provide redundant sealing to prevent any potential leak of material (i.e., a blood bag) disposed therein during transport, as described further herein.

In various embodiments, the front panel 210 defines a top edge panel 212. In various embodiments, after an object for transport (e.g., a blood bag or the like), is disposed in an opening 202 of the envelope 200 into an internal cavity, the top edge panel 212 may be folded over the opening 202 and coupled to the back panel 230 as described further herein. In this regard, the front panel 210 may comprise a sealing mechanism 242 (e.g., a double-sided tape, an epoxy, or the like), disposed on an inner surface 211 of the front panel 210. In various embodiments, the sealing mechanism 242 is a double-sided tape. For example, the sealing mechanism 242 can comprise double sided transfer tape, such as that sold by 3M Company, headquartered in Saint Paul Minnesota, and sold under the name 3M™ Scotch® ATG Transfer Tape 969. However, the present disclosure is not limited in this regard, and various sealing mechanisms 242 are within the scope of this disclosure.

In various embodiments, in response to the sealing mechanism 242 being a double sided tape, a protective layer 241 may be disposed on the adhesive (i.e., to protect the adhesive properties of the double sided tape prior to use). In this regard, the protective layer 241 may be disposable after removing the protective layer 241 from the double sided tape, in accordance with various embodiments.

Figure 2B:
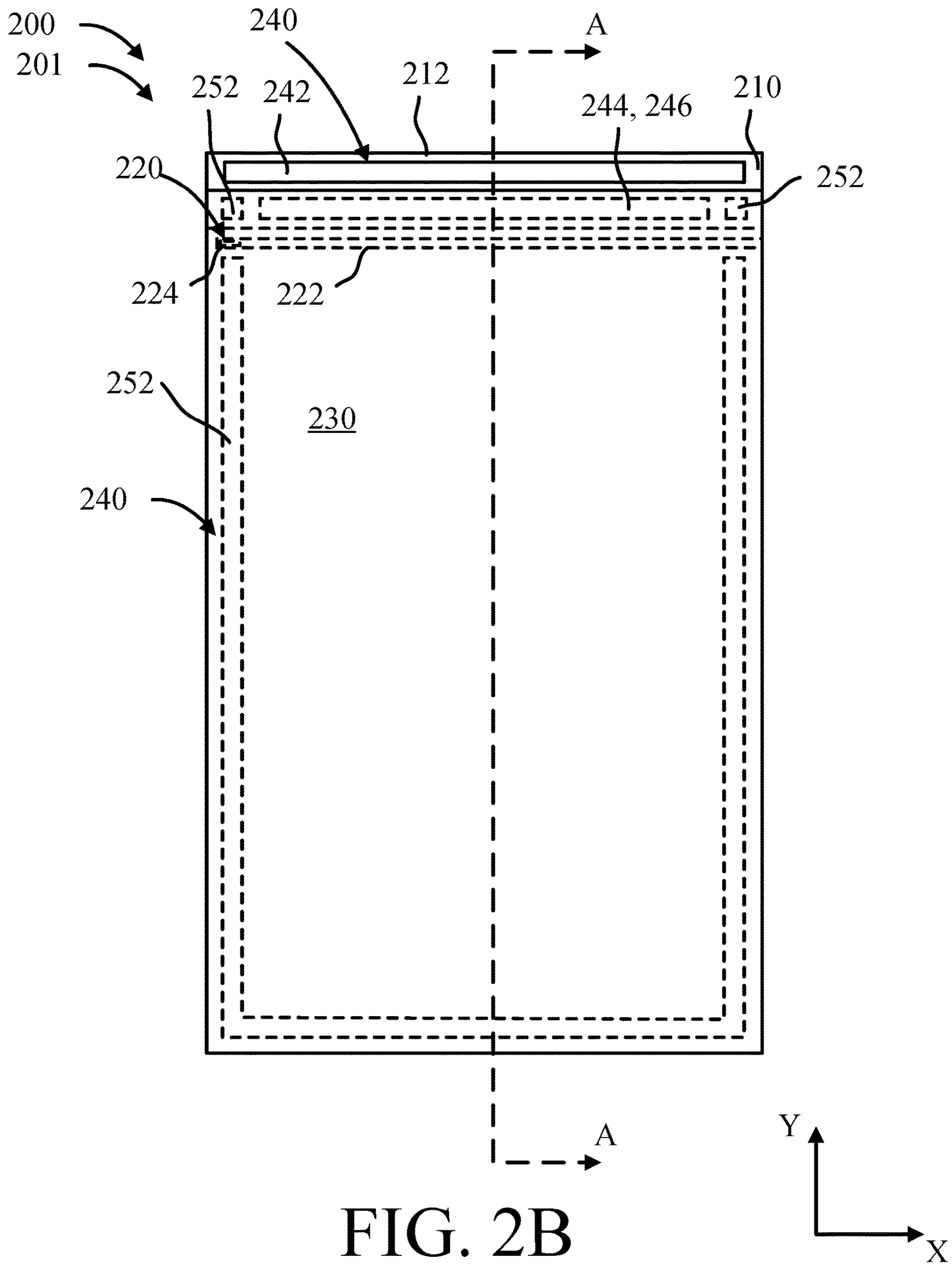
FIG. 2B illustrates a front view of an envelope for use in a blood bag transport assembly, in accordance with various embodiments.
Figure 2C:
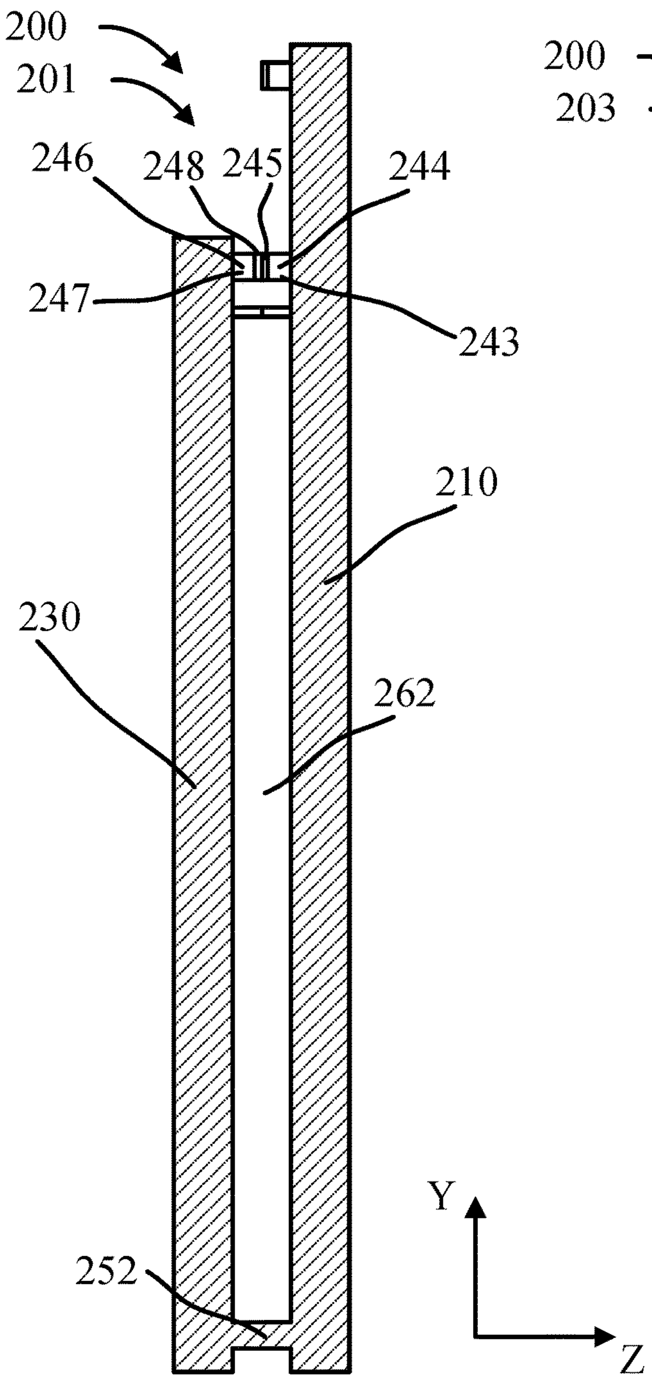
FIG. 2C illustrates a cross-sectional view of an envelope for use in a blood bag transport assembly in a manufactured state, in accordance with various embodiments.
Figure 2D:
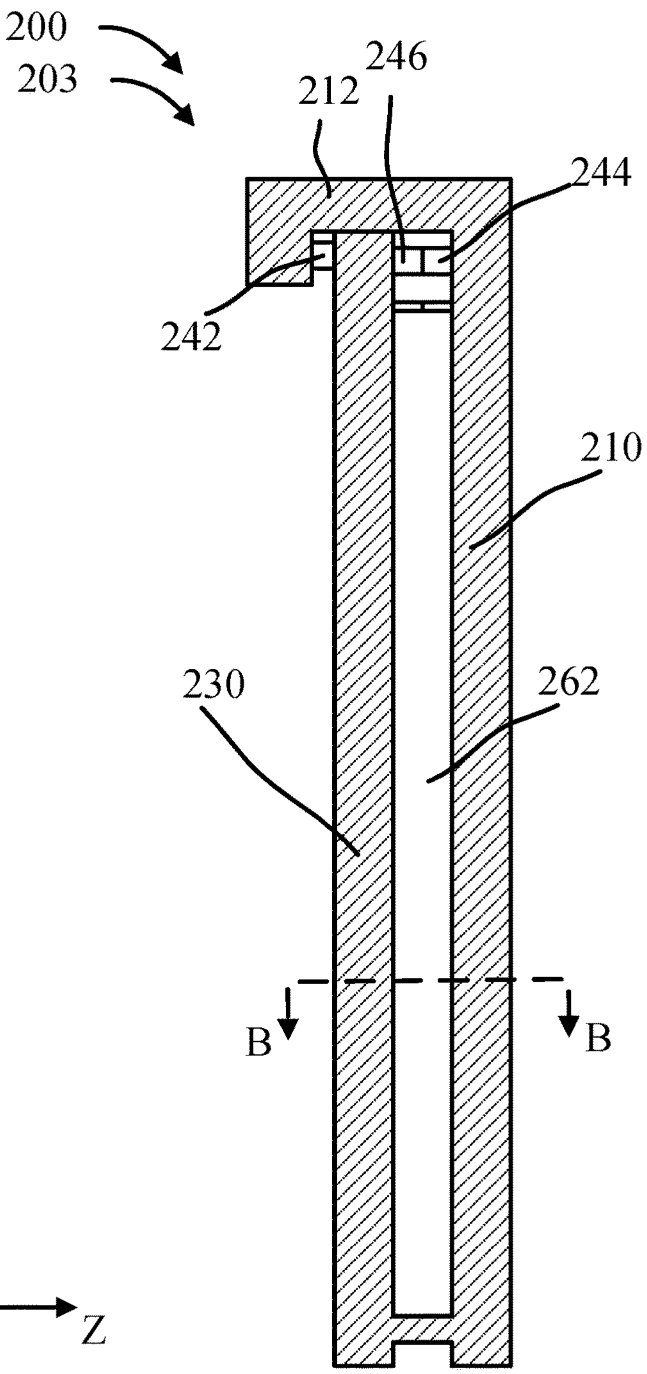
FIG. 2D illustrates a cross-sectional view of an envelope for use in a blood bag transport assembly in an assembled state, in accordance with various embodiments.

Referring now to FIG. 2B, a back planar view of the envelope 200 from FIG. 2A is illustrated with dashed lines indicating elements of the envelope 200 that are hidden from the back planar view. the envelope 200 further comprises an assembly sealing system 240. The assembly sealing system 240 comprises a sealing apparatus 220 disposed between the front panel 210 and the back panel 230. In various embodiments, the sealing apparatus 220 may comprise a track 222 and a zipper 224. Although described as having a track 222 and zipper 224, the present disclosure is not limited in this regard. For example, the sealing apparatus can comprise a press-to-close zipper and still be within the scope of this disclosure. The sealing apparatus 220 is configured to provide an initial assembly seal in the assembled state from a cavity (e.g., cavity 262 as shown in FIGS. 2C-D) defined between the back panel 230 and the front panel 210 as describe further herein.

In various embodiments, the sealing apparatus 220 is configured to transition from an open state to a closed state. In this regard, in an open state, a portion of the track 222 on the front panel 210 is separated from a portion of the track 222 on the back panel 230. In a closed state, the portion of the track 222 on the front panel 210 is coupled to the portion of the track 222 on the back panel 230.

The envelope 200 further comprises a manufacturing sealing system 250. The manufacturing sealing system 250 is configured to create a manufacturing seal around a perimeter of the envelope 200. The manufacturing sealing system 250 comprises a manufacturing seal 252 disposed between the front panel 210 and the back panel 230 along a perimeter of the envelope 200 (i.e., extending along a first side of the envelope from the sealing apparatus 220 in a negative Y-direction to a bottom left corner, from the bottom left corner along a bottom side of the envelope in a positive X-direction to a bottom right corner, from the bottom right corner in a positive Y-direction to the sealing apparatus 220). In this regard, the cavity (e.g., cavity 262 from FIGS. 2C-D) can be defined by the manufacturing seal 252 and the sealing apparatus 220, in accordance with various embodiments.

In various embodiments, the assembly sealing system 240 further comprises a sealing mechanism 244 disposed on the front panel 210 and a sealing mechanism 246 disposed on the back panel 230. The sealing mechanisms 244, 246 can be disposed vertically (i.e., in the Y-direction) between the sealing apparatus 220 and the top edge panel 212. The sealing mechanisms 244, 246 can be in accordance with the sealing mechanism 242. In this regard, the sealing mechanisms 244, 246 can each comprise a double sided tape and a protective layer. In this regard, the protective layer may be removed after an object for transport (e.g., a blood bag 130 from FIG. 1) is disposed therein. Then, the double sided tape can seal a top portion of the envelope 200 (i.e., a vertical end of the envelope). Thus, the sealing mechanisms 244, 246 may remain unexposed until the article for transport (e.g., a blood bag) is disposed in the internal cavity (e.g., cavity 262 from FIGS. 2C-D) of the envelope and the sealing mechanisms 244, 246 are to be used for an additional seal. The sealing mechanisms 242, 244, 246 can provide redundant sealing with the sealing apparatus 220 to prevent any leakage in response to an object being transported breaking (e.g., a blood bag 130 from FIG. 1 being punctured or torn). Although described herein has having a sealing mechanism 244 disposed on the front panel 210 and the sealing mechanism 246 disposed on the back panel 230 opposite the sealing mechanism 244, the present disclosure is not limited in this regard. For example, a single sealing mechanism (e.g., sealing mechanism 244 or sealing mechanism 246) can be disposed on an internal surface of one of the front panel 210 or the back panel 230 and still be within the scope of this disclosure. In various embodiments, by having two sealing mechanisms 244, 246 disposed opposite each other, a stronger seal can be obtained relative to a single sealing mechanism, in accordance with various embodiments.

Referring now to FIG. 2C, a cross-sectional view of the envelope 200 in a manufactured state along section A-A in FIG. 2B prior to sealing the envelope 200 is illustrated, with like numerals depicting like elements, in accordance with various embodiments. As shown, the manufacturing seal 252 bonds the front panel 210 to the back panel 230 and at least partially defines the cavity 262, in accordance with various embodiments. In various embodiments, FIG. 2C is not to scale and is sized for illustrative purposes. In this regard, at a bottom edge of the envelope 200 proximal the manufacturing seal 252, the front panel 210 would be nearly touching the back panel 230 in response to being joined by the manufacturing seal 252.

In various embodiments, prior to assembly (as shown in FIG. 2C), sealing mechanism 244 comprises a double sided tape 243 and a protective layer 245 in a similar manner to sealing mechanism 242 described previously herein. Similarly, the sealing mechanism 246 can comprise a double sided tape 247 and a protective layer 248. In this regard, while shipping the envelope 200 in the manufactured state, the adhesive on an otherwise exposed side of the double sided tape 243, 245 can remain protected (i.e., maintain its adhesive properties). Thus, after loading an article for transport in the cavity 262, the sealing apparatus 220 can be described in a manner described previously herein, then the protective layers 241, 245, 247 can be removed from their respective sealing mechanisms 242, 244, 246, the double sided tape 243 can be coupled to the double sided tape 245, and the top edge panel 212 can be folded over the back panel 230 and be coupled to an external surface of the back panel 230 by the sealing mechanism 242 to form the assembled state 203 as shown in FIG. 2D.

In various embodiments, in the assembled state 203 of FIG. 2D, the envelope 200 comprises redundant sealing between the cavity 262 and the top edge panel 212 (e.g., via the sealing apparatus 220 and the sealing mechanisms 244, 246). Additionally, in accordance with various embodiments, the envelope 200 includes a seal between the external surface of the back panel 230 and an internal surface of the top edge panel 212. Thus, a crease defined by a fold of the top edge panel 212 over the back panel 230 can further act as a seal and essentially provide four levels of assembly sealing between the cavity 262 and an external environment. As such, any leak from an article being transported can be maintained within the envelope 200, preventing potentially hazardous or harmful material from reaching the external environment.

Figure 2E:
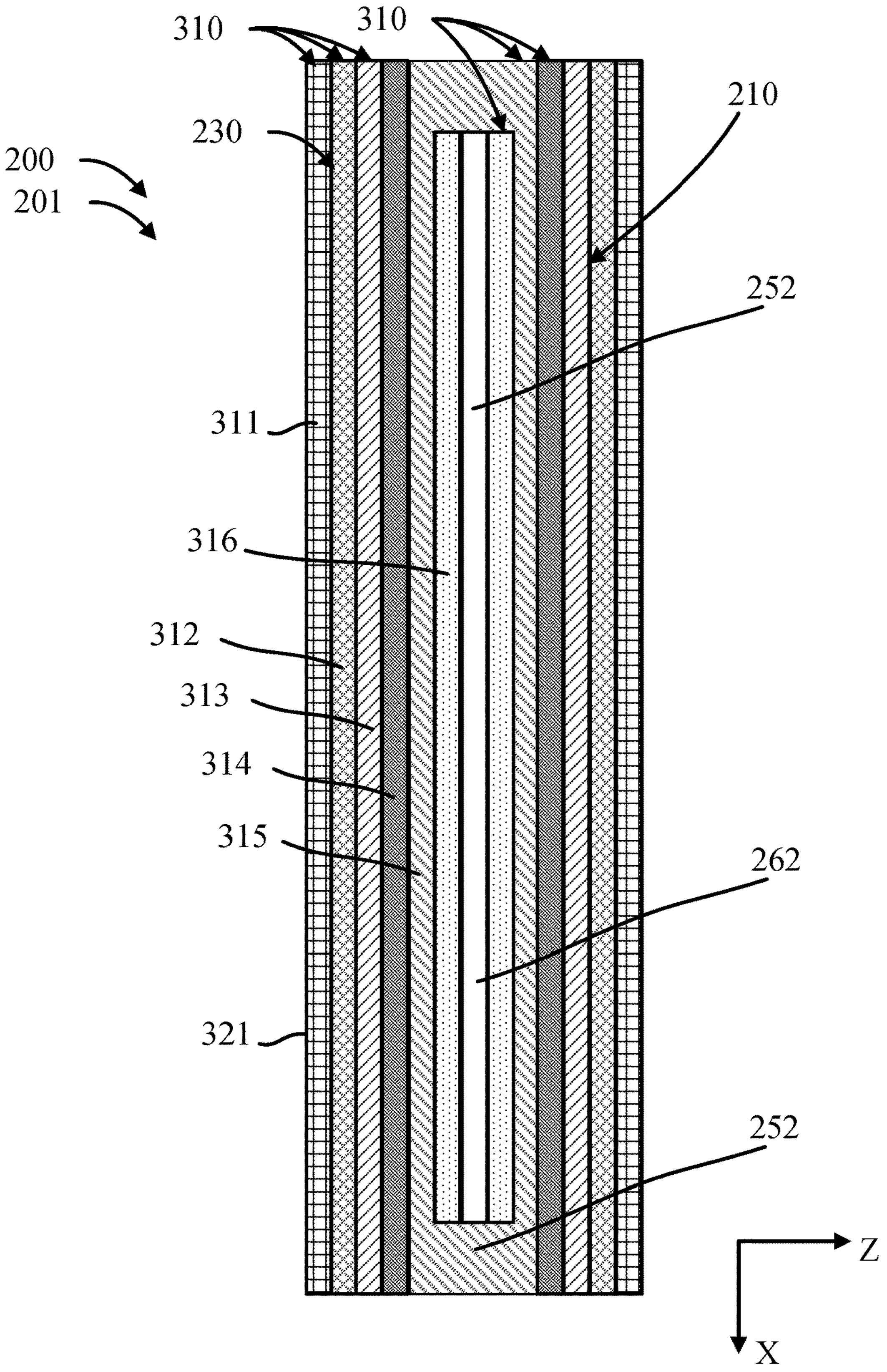
FIG. 2E illustrates a cross-sectional view of an envelope for use in a blood bag transport assembly, in accordance with various embodiments.

Referring now to FIG. 2E, a cross-sectional view of the envelope 200 from FIG. 2D along section line B-B is illustrated, in accordance with various embodiments, with like numerals depicting like elements. In various embodiments, the envelope 200 comprises a plurality of layers 310. The plurality of layers 310 include an external layer 311, an internal layer 316, and intermediate layers 312, 313, 314, 315. Although described with various intermediate layers 312, 313, 314, 315, the present disclosure is not limited in this regard. For example, any of intermediate layers 312, 313, 314, 315 can be used on their own, in combination with other intermediate layers 312, 313, 314, 315, and in any order between the external layer 311 and the internal layer 316.

In various embodiments, by having the plurality of layers 310, the elements to manufacture the envelope 200 in the manufactured state from FIGS. 2A-C can be a relatively simple process. For example, as shown in FIGS. 2A-C, in the manufactured state, the front panel 210 is coupled to the back panel 230 via the manufacturing seal 252. In this regard, two flat panels (e.g., the front panel 210 and the back panel 230 can be pressed together and the manufacturing seal 252 (e.g., an adhesive) cured to bond the front panel 210 to the back panel 230. In contrast, other support mechanisms for carrying cryogenic articles (e.g., blood bags) typically utilize metallic cassette racks that add weight, are more expensive to manufacture, and are more expensive to ship.

In various embodiments, the external layer 311 comprises a polymeric material (e.g., acrylonitrile butadiene siren (ABS), chlorinated polyvinyl chloride (CPVC), high-density polyethylene (HDPE), polybutylene (PB-1), polyethylene (PE, MDPE, HDPE, etc.), polyethylene of raised temperature (PE-RT), cross-linked polyethylene (PEX), polypropylene (PP), polyvinylidene difluoride (PVDF), un-plasticized polyvinyl chloride (UPVC)) that is able to withstand cryogenic temperatures). The external layer 311 can be configured to provide a dimensional-stable print surface. By having a dimensional-stable print surface, ink disposed on an external surface 321 of the external layer 311 can be protected. In various embodiments, the external layer 311 can provide additional material integrity to the envelope 200.

In various embodiments, the internal layer 316 can comprise a desiccant layer. In various embodiments, the desiccant layer protects the contents within the envelope from humidity changes. In various embodiments, the desiccant layer provides high moisture absorption relative to typical envelopes. For example, the internal layer 316 can comprise an absorbent polymer material capable of absorbing between 25 times and 1,000 times its own weight in water. In various embodiments, the internal layer 316 comprises a superabsorbent polymer. However, the present disclosure is not limited in this regard. In various embodiments, the internal layer 316 is configured to provide additional burst strength to the envelope 200. In various embodiments, the internal layer 316 can be Therapak™ absorbent material, such as that sold under the trademark Therapak™ 10312 by Avantor Clinical Services based in Chorley Lancashire, United Kingdom.

In various embodiments, disposed between the external layer 311 and the internal layer 316 is a barrier layer (e.g., intermediate layer 313). In various embodiments, the barrier layer is configured to provide chemical resistance from an external environment. In this regard, the barrier layer is configured to prevent chemicals from infiltrating the cavity 262 with the cryogenic article (e.g., a blood bag), disposed therein. In various embodiments, the barrier layer is configured to prevent moisture, light, and/or oxygen from infiltrating the cavity 262 as well. In various embodiments, the barrier layer is made of a high-density polyethylene (HDPE) material, such as that sold under the trademark Tyvek® 1073B by Dupont de Numours, Inc. based in Wilmington, Delaware. However, the present disclosure is not limited in this regard. For example, the barrier layer can be made of any polymeric material (e.g., acrylonitrile butadiene siren (ABS), chlorinated polyvinyl chloride (CPVC), high-density polyethylene (HDPE), polybutylene (PB-1), polyethylene (PE, MDPE, HDPE, etc.), polyethylene of raised temperature (PE-RT), cross-linked polyethylene (PEX), polypropylene (PP), polyvinylidene difluoride (PVDF), un-plasticized polyvinyl chloride (UPVC)), and still be within the scope of this disclosure.

In various embodiments, disposed between the external layer 311 and the internal layer 316 is a sealant layer (e.g., intermediate layer 315). In various embodiments, the sealant layer is configured to provide heat sealable capability to the envelope 200. In various embodiments, the sealant layer can comprise a polymeric material such as a thermoplastic polyurethane (TPU) that melts and welds to itself when heated to approximately 200° C. (400). In this regard, the sealant layer 315 can be exposed along a perimeter of the envelope 200 and act as the manufacturing seal 252. Thus, when exposed to heat, the sealant layer (e.g., intermediate layer 315) of the back panel 230 bonds itself to the sealant layer (e.g., intermediate layer 315) of the front panel 210 to form the envelope 200 in the manufactured state. In various embodiments, the sealant layer can provide additional burst strength to the envelope 200, further protecting the article (e.g., a blood bag) from external forces during transportation. In various embodiments, the sealant layer is configured to seal the article within the cavity 262. In various embodiments, the sealant layer can protect the barrier layer (e.g., intermediate layer 315).

In various embodiments, disposed between the external layer 311 and the barrier layer (e.g., intermediate layer 313) is a tie layer (e.g., intermediate layer 312). In various embodiments, the tie layer can comprise an adhesive resin (e.g., ethylene-vinyl acetate (EVA), Ethylene-methyl acrylate (EMA), Ethylene-acrylic acid (EAA), Ethylene-grafted-maleic anhydride (AMP), or the like). In this regard, the tie layer can be configured to bond the external layer 311 to the barrier layer. In various embodiments, the tie layer can also provide an additional layer of protection for the barrier layer (e.g., intermediate layer 313).

In various embodiments, disposed between the sealant layer (e.g., intermediate layer 315) and the barrier layer (e.g., intermediate layer 313) is a second tie layer (e.g., intermediate layer 314). In various embodiments, the second tie layer is in accordance with the first tie layer. For example, the second tie layer can comprise an adhesive resin (e.g., ethylene-vinyl acetate (EVA), Ethylene-methyl acrylate (EMA), Ethylene-acrylic acid (EAA), Ethylene-grafted-maleic anhydride (AMP), or the like). In various embodiments, the second tie layer is different than the first tie layer. In this regard, tie layers can adhere to different polymeric materials relative to other polymeric materials. For example, EVA or EMA can adhere well to HDPE, LDPE, PP, PS, and/or PVDC, EAA can adhere well to PA, PET, Ionomers, LDPE, EVA, EMA, and/or AI, and AMP can adhere well to PA, AI, EVOH, and/or cellulose.

Figure 3:
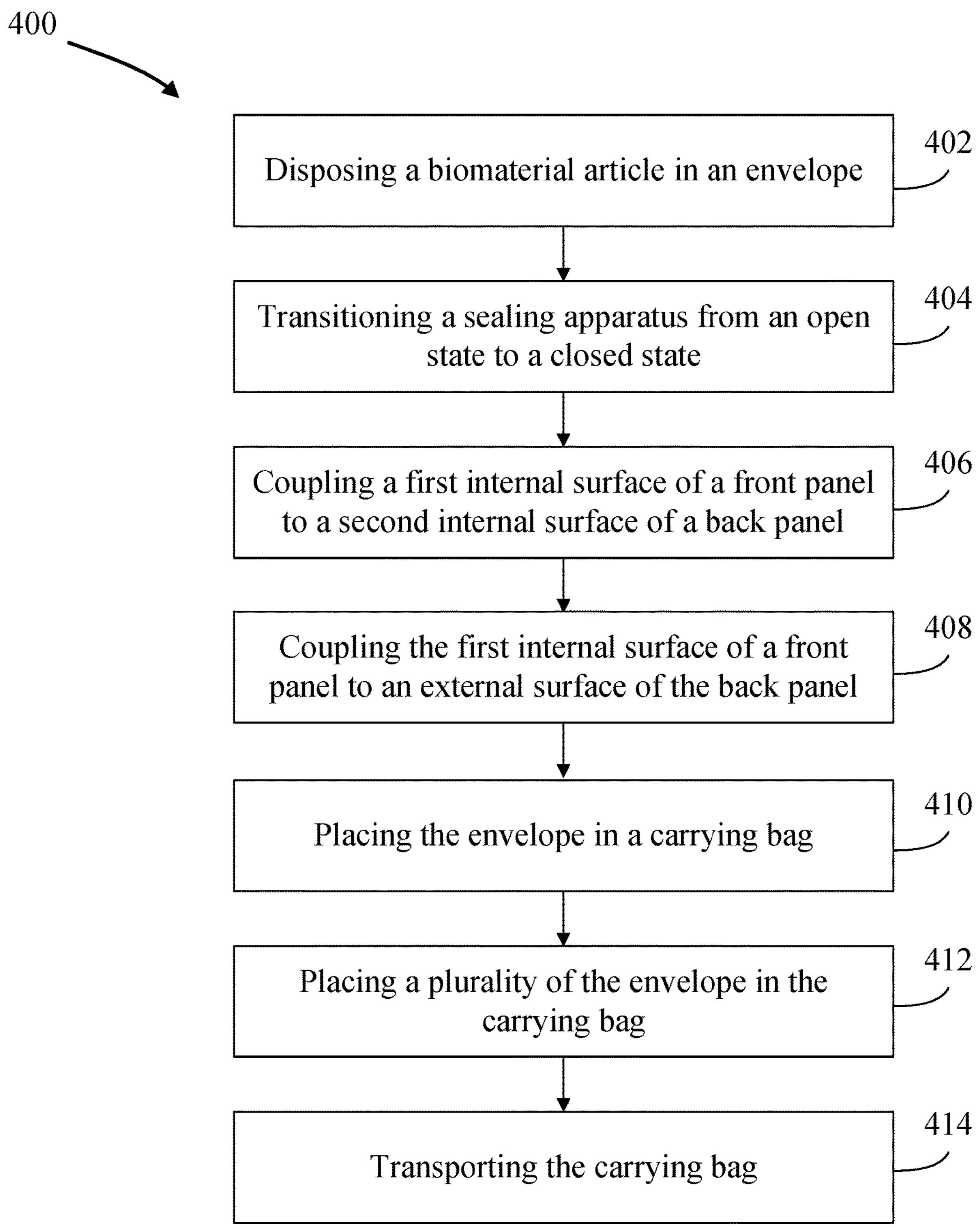
FIG. 3 illustrates a method of transporting a biomaterial article, in accordance with various embodiments.

Referring now to FIG. 3, a method 400 of transporting a plurality of biomaterial articles (e.g., blood bags 130 from FIG. 1) is illustrated, in accordance with various embodiments. The method 400 comprises disposing a biomaterial article (e.g., a blood bag 130 from FIG. 1) in an envelope (e.g., envelope 200 from FIGS. 2A-E) (block 402). The envelope 200 is in a manufactured state (e.g., FIGS. 2A-D) during block 402. In this regard, the sealing apparatus 220 is in an open state, and the blood bag can be placed in the cavity 262 of the envelope 200 in block 402.

In various embodiments, the method 400 further comprises transitioning the sealing apparatus 220 from the open state to a closed state (block 404). In this regard, the zipper 224 can slide across the track 222 and couple a track on the back panel 230 to a track on the front panel 210 to create a first seal of the cavity 262 from an external environment of the envelope 200.

In various embodiments, the method 400 further comprises coupling a first internal surface of a front panel 210 to a second internal surface of a back panel 230 (block 406). In various embodiments, the front panel 210 can be coupled to the back panel 230 in block 406 via the sealing mechanism 244 and/or sealing mechanism 246. In this regard, the sealing mechanisms 244, 246 can be coupled to each other to form a second seal between the cavity 262 and the external environment. In various embodiments, a single sealing mechanism 244 or 246 can couple to an opposite surface and still be within the scope of this disclosure.

In various embodiments, the method 400 can further comprise coupling the first internal surface of the front panel 210 to an external surface of the back panel 230 (block 408). In this regard, a top edge panel 212 of the front panel 210 can be folded over a top edge of the back panel 230 creating a crease along the top edge of the back panel 230 as shown in FIG. 2E, and the first internal surface of the top edge panel 212 can be coupled to the external surface of the back panel 230 creating additional seals of the cavity 262 from the external environment (e.g., a seal along the crease and/or a seal from coupling first internal surface to the external surface via the sealing mechanism 242).

In various embodiments, the method 400 further comprises placing the envelope 200 in a carrying bag 110 (block 410) and placing a plurality of the envelope 200 (loaded in accordance with blocks 402-408) in the carrying bag (block 412). In this regard, a plurality of loaded envelopes 200 can be placed in the carrying bag 110 to be transported together. The method 400 further comprises transporting the carrying bag (block 414).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An envelope for transporting an object, the envelope comprising:
- a front panel comprising a first plurality of layers;
- a back panel comprising a second plurality of layers, the back panel coupled to the front panel via a first seal;
- a sealing apparatus disposed between the front panel and the back panel, the sealing apparatus configured to transition from an open state to a closed state, the sealing apparatus and the first seal defining a cavity of the envelope in response to being in the closed state;
- a first sealing mechanism disposed between the front panel and the back panel, the first sealing mechanism disposed outside of the cavity; and
- a second sealing mechanism coupled to an internal surface of the front panel.

2. The envelope of claim 1, wherein the first sealing mechanism and the second sealing mechanism comprise a double sided tape.

3. The envelope of claim 2, wherein the first sealing mechanism and the second sealing mechanism each comprise a protective layer coupled to one side of the double sided tape.

4. The envelope of claim 1, wherein the first sealing mechanism is configured to couple the front panel to the back panel after the sealing apparatus is closed.

5. The envelope of claim 4, wherein the second sealing mechanism is configured to couple to an external surface of the back panel.

6. The envelope of claim 5, wherein a portion of the front panel forms a crease along a top edge of the envelope in response to coupling the second sealing mechanism to the back panel.

7. The envelope of claim 1, wherein the first plurality of layers and the second plurality of layers each comprise:
- an external layer comprising a polymeric material;
- an internal layer comprising an absorbent material; and
- a barrier layer disposed between the external layer and the internal layer.

8. The envelope of claim 7, wherein the first plurality of layers and the second plurality of layers each comprise a first tie layer disposed between the external layer and the barrier layer.

9. The envelope of claim of claim 7, wherein the first plurality of layers and the second plurality of layers each comprise a sealant layer, the sealant layer at least partially defining the first seal.

10. An envelope for transporting an object, the envelope comprising:
- a front panel and a back panel each comprising:
  - an internal layer defining an internal surface, the internal surface at least partially defining a cavity of the envelope;
  - an external layer disposed outward from the internal layer;
  - a barrier layer disposed between the internal layer and the external layer;
  - a sealant layer disposed between the barrier layer and the internal layer;
  - a first tie layer disposed between the external layer and the barrier layer; and
  - a second tie layer disposed between the sealant layer.

11. The envelope of claim 10, wherein a first portion of the sealant layer of the front panel is bonded to a second portion of the sealant layer of the back panel to form a first seal.

12. The envelope of claim 11, further comprising a sealing apparatus disposed between the front panel and the back panel, the sealing apparatus configured to transition from an open state to a closed state, the sealing apparatus and the first seal defining a cavity of the envelope in response to being in the closed state.

13. The envelope of claim 10, wherein the first tie layer couples the external layer to the barrier layer.

14. The envelope of claim 13, wherein the second tie layer couples the sealant layer to the barrier layer.

15. The envelope of claim 14, wherein the sealant layer is configured to protect the barrier layer.

16. A method of shipping a biomaterial article, the method comprising:

disposing the biomaterial article in an envelope, the envelope comprising an internal layer, an external layer, a barrier layer disposed between the internal layer and the external layer, and a sealant layer disposed between the internal layer and the barrier layer;

transitioning a sealing apparatus from an open state to a closed state to create a first seal of a cavity defined by the sealing apparatus and a manufacturing seal;

coupling a first internal surface of a front panel of the envelope to a first internal surface of a back panel of the envelope via a first sealing mechanism to create a second seal; and coupling the first internal surface of the front panel of the envelope to an external surface of the back panel of the envelope to create a third seal.

17. The method of claim 16, wherein a crease is formed at a top edge of the envelope in response to coupling the first internal surface to the external surface.

18. The method of claim 16, further comprising placing the envelope in a carrying bag.

19. The method of claim 18, further comprising placing a plurality of the envelope in the carrying bag, each envelope in the plurality of the envelope having a respective biomaterial article disposed therein.

20. The method of claim 19, further comprising transporting the carrying bag.

21. An envelope for transporting an object, the envelope comprising:

an internal layer defining an internal surface, the internal surface at least partially defining a cavity of the envelope;

an external layer disposed outward from the internal layer;

a barrier layer disposed between the internal layer and the external layer;

a sealant layer disposed between the barrier layer and the internal layer;

a first tie layer disposed between the external layer and the barrier layer; and a second tie layer disposed between the sealant layer.

22. The envelope of claim 21, further comprising a sealing system including a plurality of sealing apparatuses.

23. The envelope of claim 21, wherein the external layer comprises a polymeric material, and wherein the internal layer comprises a desiccant layer.

24. The envelope of claim 23, wherein the first tie layer and the second tie layer comprise an adhesive resin.

25. The envelope of claim 24, wherein the barrier layer comprises a second polymeric material different from the external layer, and wherein the sealant layer comprises a third polymeric material different from the barrier layer and the external layer.

26. The envelope of claim 21, wherein the envelope is configured to be resistant to brittleness and shattering at cryogenic temperatures.

* * * * *